(12) United States Patent
Iwamoto et al.

(10) Patent No.: US 8,164,697 B2
(45) Date of Patent: Apr. 24, 2012

(54) LIQUID CRYSTAL DISPLAY DEVICE

(75) Inventors: Yoshihisa Iwamoto, Yokohama (JP); Hajime Shimizu, Iida (JP)

(73) Assignee: Stanley Electric Co., Ltd., Tokyo (JP)

( * ) Notice: Subject to any disclaimer, the term of this patent is extended or adjusted under 35 U.S.C. 154(b) by 42 days.

(21) Appl. No.: 12/006,734

(22) Filed: Jan. 4, 2008

(65) Prior Publication Data

US 2008/0174707 A1 Jul. 24, 2008

(30) Foreign Application Priority Data

Jan. 24, 2007 (JP) ................. 2007-013913

(51) Int. Cl.
*G02F 1/1343* (2006.01)
*C09K 19/02* (2006.01)

(52) U.S. Cl. .......................... 349/39; 349/178
(58) Field of Classification Search .......... 349/39, 349/178
See application file for complete search history.

(56) References Cited

U.S. PATENT DOCUMENTS

| | | | |
|---|---|---|---|
| 5,946,064 A * | 8/1999 | Lee | 349/124 |
| 6,040,885 A | 3/2000 | Koike et al. | |
| 6,927,827 B2 | 8/2005 | Jung et al. | |
| 7,211,303 B2 | 5/2007 | Momoi | |
| 2004/0012741 A1 | 1/2004 | Jung et al. | |
| 2004/0066480 A1 * | 4/2004 | Yoshida et al. | 349/123 |
| 2006/0134348 A1 | 6/2006 | Momoi | |

FOREIGN PATENT DOCUMENTS

| | | |
|---|---|---|
| JP | 07-318879 A | 12/1995 |
| JP | 10-096929 A | 4/1998 |
| JP | 2000-292792 A | 10/2000 |
| JP | 2001-108978 A | 4/2001 |
| JP | 2005-234254 A | 9/2005 |

OTHER PUBLICATIONS

U.S. Appl. No. 12/006,733, filed Jan. 4, 2008; Inventors: Yoshihisa Iwamoto et al Title: Liquid Crystal Display Device and Its Manufacture Method.
Japanese Office Action dated Nov. 15, 2011 (and English translation thereof) in counterpart Japanese Application No. 2007-013913.

* cited by examiner

*Primary Examiner* — Mark Robinson
*Assistant Examiner* — Erin Chiem
(74) *Attorney, Agent, or Firm* — Holtz, Holtz, Goodman & Chick, PC

(57) ABSTRACT

A liquid crystal display device includes: a pair of substrates each disposed on each opposing plane and having an electrode of a predetermine shape; a vertical alignment film formed covering each of the electrodes of the pair of substrates and subjected to a rubbing alignment process; an insulating film formed between the electrode and the vertical alignment film in each of the pair of substrates and having necessary insulation; and liquid crystal sandwiched between the pair of substrates and having a negative dielectric anisotropy $\Delta\in$ and a specific resistance $\rho_{c1}$ of $1.0 \times 10^{14}$ $\Omega$cm to $1.0 \times 10^{15}$ $\Omega$cm, wherein a structure between the electrodes is selected to satisfy conditions of $T \leq 5.2 \times \tau_{c1} \times 1/(1 \times 10^{12})$ sec and $T \leq 500$ sec, where T is a charge resident time until a display image disappears completely after static electricity of 10 kV is applied between the electrodes of the pair of substrate and the display image is tuned on. It is possible to prevent alignment defects to be caused by static electricity generated by rubbing of a liquid crystal display device.

5 Claims, 3 Drawing Sheets (2A)

(2B)

(3A)

| SAMPLE GROUPE | ALIGNMENT FILM MATERIAL | ALIGNMENT HOLE FORMATION RATE |
|---|---|---|
| SG-A | PI-A | 75% |
| SG-B | PI-B | 30% |
| SG-C | PI-C | 12% |
| SG-D | PI-D | 1% |

(3B)

| SAMPLE GROUPE | ALIGNMENT FILM MATERIAL | CHARGE RESIDENT TIME |
|---|---|---|
| SG-A | PI-A | 2320 sec |
| SG-B | PI-B | 520 sec |
| SG-C | PI-C | 350 sec |
| SG-D | PI-D | 410 sec |

LIQUID CRYSTAL DISPLAY DEVICE

CROSS REFERENCE TO RELATED APPLICATION

This application is based on and claims priority of Japanese Patent Application No. 2007-013913 filed on Jan. 24, 2007, the entire contents of which are incorporated herein by reference.

BACKGROUND OF THE INVENTION

A) Field of the Invention

The present invention relates to a liquid crystal display device, and more particularly to a vertical alignment type liquid crystal display device.

B) Description of the Related Art

Alignment directions of liquid crystal molecules of a liquid crystal display device (particularly a vertical alignment type liquid crystal display device) are controlled by a rubbing process for alignment films to improve the image quality. The present inventors and others have proposed in JP-A-2005-234254 a liquid crystal display device having a uniform pretilt angle and no rubbing flaws after a rubbing process for an organic polymer material thin film such as polyimide formed on the substrates, and its manufacture method.

An alignment film of a liquid crystal display device is charged with static electricity by a rubbing process. As this static electricity is discharged, a liquid crystal alignment function of the alignment film is damaged and an alignment defect is formed. This liquid crystal display device is a defective product having a localized optical hole (in this specification, this localized optical hole is called an alignment hole). The alignment hole forms a white dot in normally black display, and a black dot in normally white display.

JP-A-HEI-7-318879 has proposed a method of preventing alignment defects to be caused by static electricity discharge by externally connecting the electrodes to make them have the same potential.

SUMMARY OF THE INVENTION

It is an object of the present invention to provide a liquid crystal display device capable of eliminating alignment defects to be caused by static electricity generated during a rubbing process.

According to one aspect of the present invention, there is provided a liquid crystal display device includes: a pair of substrates each disposed on each opposing plane and having an electrode of a predetermine shape; a vertical alignment film formed covering each of the electrodes of the pair of substrates and subjected to a rubbing alignment process; an insulating film formed between the electrode and the vertical alignment film in each of the pair of substrates and having necessary insulation; and liquid crystal sandwiched between the pair of substrates and having a negative dielectric anisotropy $\Delta\varepsilon$ and a specific resistance $\rho_{c1}$ of $1.0\times10^{14}$ Ωcm to $1.0\times10^{15}$ Ωcm, wherein a structure between the electrodes is selected to satisfy conditions of $T \leq 5.2 \times \tau_{c1} \times 1/(1\times10^{12})$ sec and $T \leq 500$ sec, where T is a charge resident time until a display image disappears completely after static electricity of 10 kV is applied between the electrodes of the pair of substrate and the display image is tuned on. It is possible to prevent alignment defects to be caused by static electricity generated by rubbing of a liquid crystal display device.

BRIEF DESCRIPTION OF THE DRAWINGS

FIG. 3A is a table showing an alignment hole forming rate of each sample group, and FIG. 3B is a table showing a charge resident time of each sample group in static electricity experiments.

DESCRIPTION OF THE PREFERRED EMBODIMENTS

Figure 1:
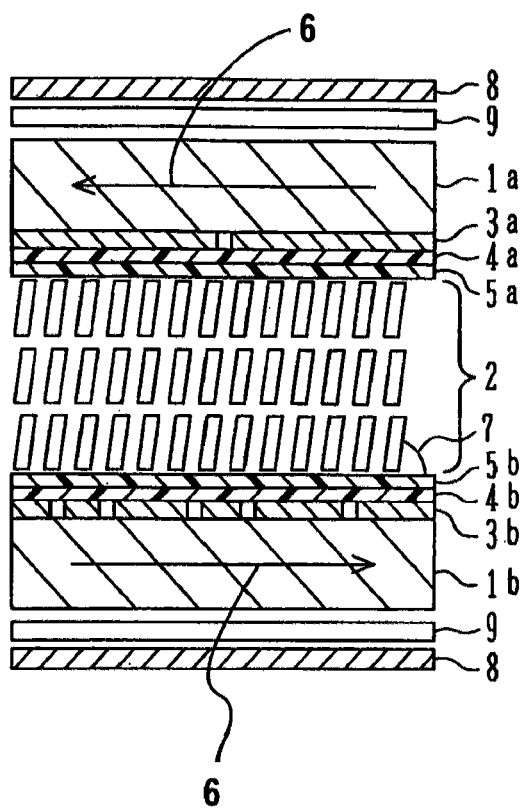
FIG. 1 is a schematic cross sectional view of a liquid crystal display device.

FIG. 1 is a schematic cross sectional view of a liquid crystal display device. The liquid crystal display device shown has a transparent upper substrate 1a and an opposing transparent lower substrate 1b, and a liquid crystal layer 2. A device outer size is a lateral length of about 160 mm and a vertical length of about 50 mm. A transparent upper electrode 3a is formed as a common electrode on the upper substrate 1a on the liquid crystal layer 2 side. A transparent lower electrode 3b is formed as a segment electrode on the lower substrate 1b. Both the transparent electrodes 3a and 3b are superposed upon each other, sandwiching the liquid crystal layer 2. The superposed area defines a display area. Both the substrates 1a and 1b are provided with alignment films 5a and 5b on the liquid crystal layer 2 side, the alignment films covering both the transparent electrodes. Insulating films 4a and 4b are formed between the alignment films 5a and 5b and the transparent electrodes 3a and 3b, respectively. Polarizing plates 8 are formed above the substrates on the side opposite to the liquid crystal layer 2.

A visual angle compensation plate 9 may be formed between each substrate and polarizing plate, when necessary. The structure without the insulating films 4a nd 4b may be used.

The rubbing process described in JP-A-2005-234254 was executed for the alignment films. Rubbing directions are illustratively shown by arrows 6. With the rubbing process, liquid crystal molecules are aligned uniformly at an angle 7 relative to the substrate when voltage is not applied (in this specification, this angle is called a pretilt angle).

The present inventors conducted experiments to check how an alignment hole formation rate changed with vertical alignment film material of four kinds. The materials used in the experiments were polyimide-based vertical alignment films PI-A, PI-B and PI-C manufactured by Chisso Petrochemical Corp. and a polyimide-based vertical alignment film PI-D manufactured by Nissan Chemical Industries, Ltd. Surface free energies of four alignment films calculated from measured contact angles by using pure water and diode-methane were 35 mN/m to 39 mN/m.

For the experiments, 100 liquid crystal display device samples were formed for each of four alignment film materials. Sample groups are represented by SG-A, SG-B, SG-C and SG-D (an alphabet after SG- corresponds to an alphabet after PI- of the alignment film material).

Each sample was formed by the following sequence. First, indium tin oxide (ITO) was sputtered on the common substrate 1a and segment substrate 1b which were made of, e.g., glass. Thereafter, the ITO layers were patterned to form the common electrode 3a and segment electrode 3b.

After polysilane-based insulating films 4a and 4b were formed on the ITO electrodes 3a and 3b formed on the common electrode 1a and segment electrode 1b, respectively, a pattern of one of four kinds of vertical alignment films was printed by flexographic printing on each insulating film, and baked for 60 minutes at 180° C.

Thereafter, a rubbing process was executed for common and segment sides with a cotton rubbing cloth. The rubbing directions were set as antiparallel alignment when both the substrates are bonded.

Sealing material was printed on one substrate, and a spacer of 4 μm in thickness was formed through spraying on the other substrate. Both the substrates were superposed upon each other and the sealing material was baked while both the substrates were pressed, to form a vacant liquid crystal cell.

The bonded substrate was cut into a liquid crystal cell. Thereafter, liquid crystal material having a negative dielectric constant anisotropy $\Delta\in$ and a specific resistance $\rho_{c1}$ of $1.0\times10^{14}$ Ωcm was injected by vacuum injection, and the liquid crystal cell was sealed to form a finished liquid crystal cell. A plurality of liquid crystal cells may be formed by cutting a pair of glass substrates.

Thereafter, the liquid crystal cell was heated at a temperature of phase transition to an isotropic phase or higher, and an iodene-based polarizing plate SKN18243T manufactured by Polatechno Co. Ltd. was bonded to the front and back surfaces of the cell. Electrode lead terminals were formed to complete the liquid crystal display device sample.

The pretilt angle 7 of liquid crystal molecules of each sample was 88.0 to 89.5°.

Next, the liquid crystal display device sample groups SG-A, SG-B, SG-C and SG-D using each alignment film were observed, each sample group having 100 samples as described above. It was defined that an alignment hole was formed if even one alignment hole (white dot) is formed in the in-plane (including an area other than the effective display area) of each sample. An alignment hole formation rate of each sample group was checked. If the alignment hole is outside the effective display area, the sample is regarded as a proper product to be shipped.

Figure 2:
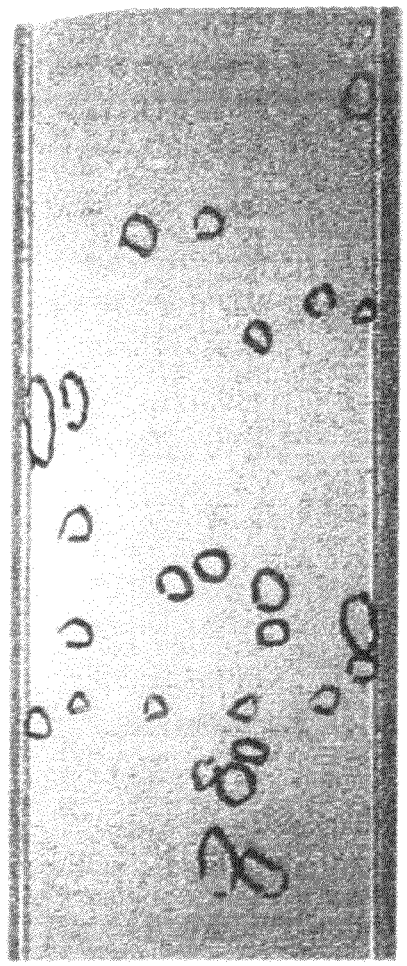
FIGS. 2A and 2B are photographs of a normally black segment display type liquid crystal display device.
Figure 2:
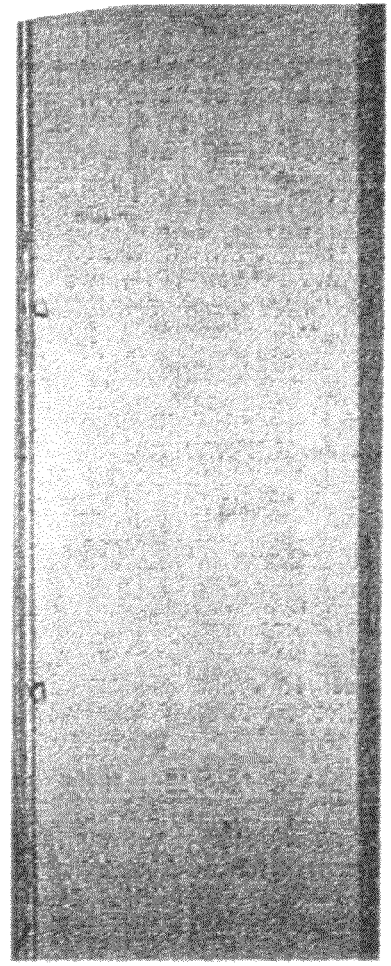

FIGS. 2A and 2B are photographs of liquid crystal display device samples in which alignment holes are formed. The photograph of FIG. 2A shows one sample in the sample group SG-A. As shown, alignment holes are formed at positions circled with a black ink pen.

The photograph of FIG. 2B shows one sample in the sample group SG-B. The number of alignment holes is reduced in the sample of the sample group SG-B as compared to the sample of the sample group SG-A. There is a similar tendency also for all samples of the sample groups.

FIG. 3A is a table showing an alignment hole formation rate of each sample group. It can be seen from this table that there is a large difference of the alignment hole formation rate among the sample groups. The alignment hole formation rate of the sample group SG-A is as high as 75%, and the alignment hole formation rates of the sample groups SG-C and SG-D are as relatively low as 12% and 1%, respectively. Since the other constituent elements are common for all the sample groups, it can be considered that a difference of the alignment hole formation rate results from a difference of the alignment film material. It can be considered from the table that it is effective to use the alignment film materials PI-C and PI-D in order to prevent alignment defects.

The inventors conducted then the following experiments to evaluate the characteristics of each alignment film from another viewpoint. Static electricity of 10 kV was applied to five points of each sample, and after the whole effective display portion (segment display portion) was turned on, the time was measured until the displayed image on the sample visually disappears completely by gradual discharge of electric charges. This measurement is equivalent to measuring a charge resident time of the liquid crystal cell. It can be considered that this measurement can evaluate the charge characteristics of the alignment film material, because each liquid crystal display sample group has the same insulating films and liquid crystal material.

The phenomenon that static electricity generated by rubbing discharges between the electrodes of the same substrate to which phenomenon the inventors pay attention, is different from the natural discharge phenomenon of electric charges via liquid crystal in the 10 kV static electricity test described above. The 10 kV static electricity test is known by those skilled in the art as a test for checking the characteristics of a finished liquid crystal display device.

FIG. 3B is a table showing the measurement results of each sample group. As shown, a charge resident time of the sample group SG-A having the alignment hole formation rate of 75% is 2320 seconds. A charge resident time of the sample group SG-B having the alignment hole formation rate of 30% is 520 seconds. The charge resident times of the sample groups SG-C and SG-D having a relatively low alignment hole formation rate are 350 seconds and 410 seconds, respectively. Since the charge resident time relies upon various factors, a relation between the alignment hole formation rate and the charge resident time is not in one-to-one correspondence. However, it can be considered that there is some correlation between the charge resident time and alignment defects. Namely, it can be considered that the sample group having a short charge resident time has a low alignment hole formation rate. If the charge resident time is short, there is a tendency that an average alignment hole formation rate of each sample group becomes small.

It can be considered from the measurement results shown in FIG. 3B that generation of alignment defects can be suppressed by using the alignment film material having the charge resident time not longer than 500 seconds and preferably not longer than 450 seconds in the 10 kV static electricity test, if the liquid crystal material is used having the specific resistance $\rho_{c1}$ of $1\times10^{14}$ Ωcm.

Figures 3, 4:
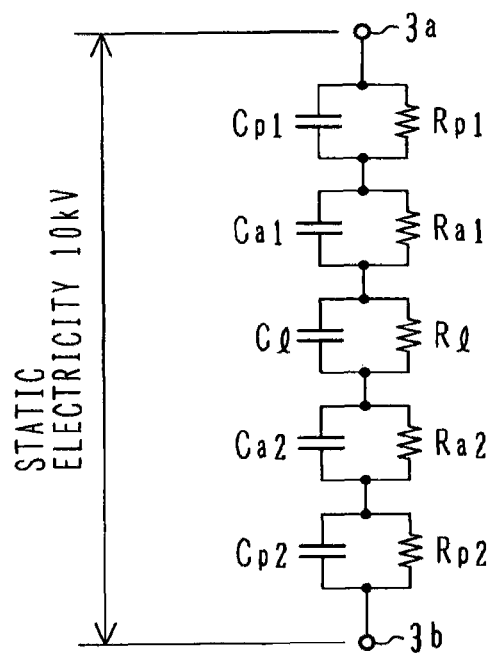
FIG. 4 is an equivalent circuit of opposing electrodes of a liquid crystal display device.

With reference to FIG. 4, studies are made on the influence of liquid crystal material upon the charge resident time. FIG. 4 is an equivalent circuit of opposing electrodes of a liquid crystal display device. As shown in FIG. 4, the equivalent circuit between the transparent electrodes 3a and 3b (including the transparent electrodes themselves) is a circuit having insulating films, alignment films and a liquid crystal layer serially connected, with a parallel connection of a capacitance component (insulating film: Cp1, Cp2, alignment film: Ca1, Ca2, liquid crystal: C1) and a resistance component (insulating film: Rp1, Rp2, alignment film: Ra1, Ra2, liquid crystal: R1).

Static electricity of 10 kV is applied to a liquid crystal display device to accumulate electric charges in the capacitance components of the equivalent circuit, and the display portion is turned on. Thereafter, application of the static electricity is stopped to disconnect a closed electric circuit. In this case, the electric charges accumulated in the capacitance components are consumed by resistance components connected in parallel to the capacitance components, and a displayed image disappears when the electric charges are consumed completely. The capacitance components and resistance components (depending upon the specific resistance of liquid crystal material) of the liquid crystal layer influence the time until the display portion disappears.

A specific resistance of liquid crystal material used in a general vertical alignment type liquid crystal display device is about $1\times10^{12}$ Ωcm to about $1\times10^{15}$ Ωcm. A relative dielectric constant determining a capacitance value is different for each liquid crystal material, and is about 2 to several ten. It is considered that the charge resident time of static electricity accumulated in the equivalent circuit is greatly influenced by the resistance components. It is therefore considered that as the specific resistance lowers, the charge resident time is shortened. For example, if a sample SB-2 is formed by using liquid crystal material having a specific resistance of about $1\times10^{12}$ Ωcm under the same conditions as those of the sample group SG-B, it is expected that the charge resident time in the 10 kV static electricity test is about 5 seconds. The charge resident time is expected to be shortened further if PI-C or PI-D is used as the alignment film material.

If one of the alignment film materials PI-B, PI-C and PI-D is used, the following formula (1) is considered to be satisfied between the charge resident time T and the liquid crystal specific resistance $\rho_{c1}$:

$$T \leq 5.2 \times \rho_{c1} \times 1/(1\times10^{12}) \text{sec} \qquad (1)$$

If the structure between the electrodes (particularly a combination of the alignment film material and the liquid crystal material) is selected which structure satisfies the formula (1) and has the charge resident time T of not longer than 500 seconds and preferably not longer than 450 seconds, it is expected to prevent alignment defects to be caused by discharge of static electricity generated by the rubbing process. The advantages of preventing static electricity discharge can therefore be prevented also by using the material (particularly alignment film material) other than those described in the specification, if the material satisfies the above-described conditions.

A liquid crystal display device providing the above-described advantages may be segment display type, dot matrix display type and segment-dot matrix display type vertical alignment liquid crystal display devices operated by a simple matrix drive method.

The present invention has been described in connection with the preferred embodiments. The invention is not limited only to the above embodiments. It will be apparent to those skilled in the art that other various modifications, improvements, combinations, and the like can be made.

What are claimed are:

1. A liquid crystal display device comprising:
    a pair of substrates provided in opposing planes, respectively;
    wherein said liquid crystal display device comprises, on each of said substrates: (i) a transparent electrode; (ii) a vertical alignment film covering said transparent electrode and subjected to a rubbing alignment process; and (iii) an insulating film provided between said transparent electrode and said vertical alignment film;
    wherein said transparent electrodes overlap each other, and an overlapped area of said transparent electrodes defines a display area;
    wherein a liquid crystal is sandwiched between said pair of substrates and has a negative dielectric anisotropy $\Delta\in$ and a specific resistance $\rho_{c1}$ of $1.0\times10^{12}$ Ωcm to $1.0\times10^{15}$ Ωcm; and
    wherein a structure including said vertical alignment films, said insulating films and said liquid crystal between said respective transparent electrodes of said pair of substrates is selected to satisfy conditions of $T\leq 5.2\times\rho_{c1}\times 1/(1\times10^{12})$ sec and $T\leq 500$ sec, where T is a charge resident time until a display image disappears completely after static electricity of 10 kV is applied between said transparent electrodes of said pair of substrates and the display image is turned on.

2. The liquid crystal display device according to claim 1, wherein an alignment film material satisfying said conditions is used as a material of said vertical alignment films.

3. The liquid crystal display device according to claim 1, wherein said charge resident time T satisfies a condition of $T\leq 450$ sec.

4. The liquid crystal display device according to claim 1, wherein a surface free energy of each of said vertical alignment films is 35 mN/m to 39 mN/m.

5. The liquid crystal display device according to claim 4, wherein an angle of liquid crystal molecules of said liquid crystal relative to a substrate surface is 88.0° to 89.5° when no voltage is applied.

\* \* \* \* \*